US012748320B2

(12) United States Patent
Kikuchi et al.

(10) Patent No.: US 12,748,320 B2
(45) Date of Patent: Sep. 29, 2026

(54) SEMIFINISHED LENS

(71) Applicant: HOYA LENS THAILAND LTD., Prachatipat (TH)

(72) Inventors: Yoshihiro Kikuchi, Tokyo (JP); Shinichi Yokoyama, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 392 days.

(21) Appl. No.: 18/269,121

(22) PCT Filed: Oct. 25, 2021

(86) PCT No.: PCT/JP2021/039208

§ 371 (c)(1),
(2) Date: Jun. 22, 2023

(87) PCT Pub. No.: WO2022/137772

PCT Pub. Date: Jun. 30, 2022

(65) Prior Publication Data

US 2024/0045231 A1 Feb. 8, 2024

(30) Foreign Application Priority Data

Dec. 24, 2020 (JP) ................................ 2020-215652
Apr. 5, 2021 (JP) ................................ 2021-064294

(51) Int. Cl.
*G02C 7/02* (2006.01)
*G02F 1/155* (2006.01)

(52) U.S. Cl.
CPC ............... *G02C 7/02* (2013.01); *G02F 1/155* (2013.01)

(58) Field of Classification Search
CPC ...... G02C 7/02; G02C 7/024; G02C 2202/16; G02C 7/061; G02C 7/101; G02C 7/021;
(Continued)

(56) References Cited

U.S. PATENT DOCUMENTS 6,491,393 B1 * 12/2002 Appleton ......... B29D 11/00317 351/159.52
6,743,486 B1 * 6/2004 Miyazawa .......... B24B 13/0055 427/256
(Continued)

FOREIGN PATENT DOCUMENTS

CN 100566933 C 12/2009
EP 1762337 A1 3/2007
(Continued)

OTHER PUBLICATIONS

Oct. 29, 2024 Extended European Search Report issued in European Patent Application No. 21909929.8.
(Continued)

*Primary Examiner* — Matthew Y Lee
(74) *Attorney, Agent, or Firm* — Oliff PLC

(57) ABSTRACT

A semifinished lens is configured with at least three marks for specifying the center position of a frame shape. When the semifinished lens is viewed in an optical axis direction, the at least three marks include a pair of marks located on a first straight line passing through the center position and a mark located on a second straight line that is orthogonal to the first straight line and passes through the center position.

8 Claims, 8 Drawing Sheets

(58) Field of Classification Search
CPC ....... G02F 1/155; B24B 9/14; B24B 13/0055; B24B 9/148; B24B 9/146; B29D 11/00009; B29D 11/00317; B29D 11/00951
See application file for complete search history.

(56) References Cited

U.S. PATENT DOCUMENTS

| | | | | |
|---|---|---|---|---|
| 2008/0051012 | A1* | 2/2008 | Akiyama | B24B 9/148 451/6 |
| 2008/0212198 | A1* | 9/2008 | Kuwa | B29D 11/00009 249/117 |
| 2014/0055743 | A1* | 2/2014 | Okubo | G02C 7/021 351/159.69 |
| 2014/0118681 | A1 | 5/2014 | Chiu et al. | |
| 2014/0232978 | A1 | 8/2014 | Park et al. | |
| 2016/0001414 | A1* | 1/2016 | Dubois | B24B 13/0055 351/159.8 |
| 2018/0354212 | A1* | 12/2018 | Padiou | B24B 13/065 |
| 2019/0187487 | A1* | 6/2019 | Abe | B29D 11/00317 |
| 2020/0166775 | A1 | 5/2020 | Ookubo | |

FOREIGN PATENT DOCUMENTS

| | | | |
|---|---|---|---|
| JP | H07168209 | A * | 7/1995 |
| JP | 2000-288891 | A | 10/2000 |
| JP | 200653227 | A | 2/2006 |
| JP | 2007-313633 | A | 12/2007 |
| JP | 201514743 | A | 1/2015 |
| JP | 2017-111389 | A | 6/2017 |
| JP | 2018-31802 | A | 3/2018 |
| WO | 2006/003939 | A1 | 1/2006 |
| WO | 2019003343 | A1 | 1/2019 |

OTHER PUBLICATIONS

Dec. 14, 2021 International Search Report issued in International Patent Application No. PCT/JP2021/039208.

Dec. 14, 2021 Written Opinion issued in International Patent Application No. PCT/JP2021/039208.

Jan. 16, 2025 Office Action issued in Korean Patent Application No. 10-2023-7023039.

May 6, 2025 Office Action issued in Chinese Patent Application No. 202111255224.3.

May 7, 2025 Office Action issued in Japanese Patent Application No. 2021-064294.

Oct. 28, 2025 Office Action issued in Japanese Patent Application No. 2021-064294.

Nov. 12, 2025 Office Action issed in Chinese Patent Application No. 202111255224.3.

* cited by examiner

SEMIFINISHED LENS

TECHNICAL FIELD

The present invention relates to a semifinished lens.

BACKGROUND ART

It is known that spectacle lenses are produced according to a prescription by using semifinished lenses, each having an optical surface on one side and a non-optical surface on the other side. For example, the non-optical surface of a semifinished lens is processed with respect to a reference point located at the geometric center of a unifocal lens or with respect to a reference point located at a point specified by a hidden mark of a progressive power lens, a frame shape is laid out for the machined lens, and the lens is subjected to lens shape processing along the laid out frame shape. Thus, a cut lens mountable into a frame is produced.

Spectacle lenses including electrochromic films (hereinafter referred to as "EC lenses") have been known in recent years, the electrochromic film being capable of reversibly controlling a developing and reducing color by applying a voltage (for example, see PTL 1). A semifinished lens for this kind of EC lens has, for example, a frame-shaped electrochromic film that is attached on the optical surface.

CITATION LIST

Patent Literature

[PTL 1] Japanese Patent Application Publication No. 2017-111389

SUMMARY OF INVENTION

Technical Problem

On a semifinished lens not designed for an EC lens, the layout position of a frame is determined after processing on the non-optical surface. Thus, in the step of processing the non-optical surface, the position of an eye point does not need to be determined with high accuracy with respect to the layout position of a frame shape.

In contrast, on a semifinished lens designed for an EC lens, the layout position of a frame is determined before processing on the non-optical surface. Thus, in the step of processing the non-optical surface, the position of an eye point needs to be determined with high accuracy with respect to the layout position of a frame shape. This is because if the position of an eye point has an error with respect to the layout position of a frame shape as a result of processing on the non-optical surface, for example, lens shape processing performed according to the eye point may cause a misalignment between the position of lens shape processing and the position of an electrochromic film on the optical surface and thus partially cut the electrochromic film into a defective item, and lens shape processing performed according to the electrochromic film may deviate the position of the eye point from the prescription.

In a semifinished lens designed for an EC lens, a non-optical surface may be processed with respect to points specified by a geometric center and a hidden mark as in the related art. However, these reference points of processing may lead to difficulty in processing the non-optical surface while strictly considering the layout position of a frame shape, making it difficult to determine the position of an eye point with high accuracy with respect to the layout position of the frame shape.

In view of the above-mentioned circumstances, an object of the present invention is to provide a semifinished lens suitable for determining the position of an eye point with high accuracy with respect to the layout position of a frame shape.

Solution to Problem

A semifinished lens according to an embodiment of the present invention has at least three marks for specifying the center position of a frame shape. When the semifinished lens is viewed in an optical axis direction, the at least three marks include a pair of marks located on a first straight line passing through the center position and a mark located on a second straight line that is orthogonal to the first straight line and passes through the center position.

The semifinished lens according to the embodiment of the present invention may be configured such that the at least three marks are made in a portion to be cut by lens shape processing.

The semifinished lens according to the embodiment of the present invention may be configured such that the at least three marks are made on the optical surface of the semifinished lens.

The semifinished lens according to the embodiment of the present invention may further include a film including an electrochromic layer between a pair of electrode layers and having the frame shape.

The semifinished lens according to the embodiment of the present invention may further include marks made in the frame shape on the optical surface of the semifinished lens.

Advantageous Effects of Invention

Using the semifinished lens according to the embodiment of the present invention can determine the position of an eye point with high accuracy with respect to the layout position of a frame shape.

DESCRIPTION OF EMBODIMENTS

Figure 1:
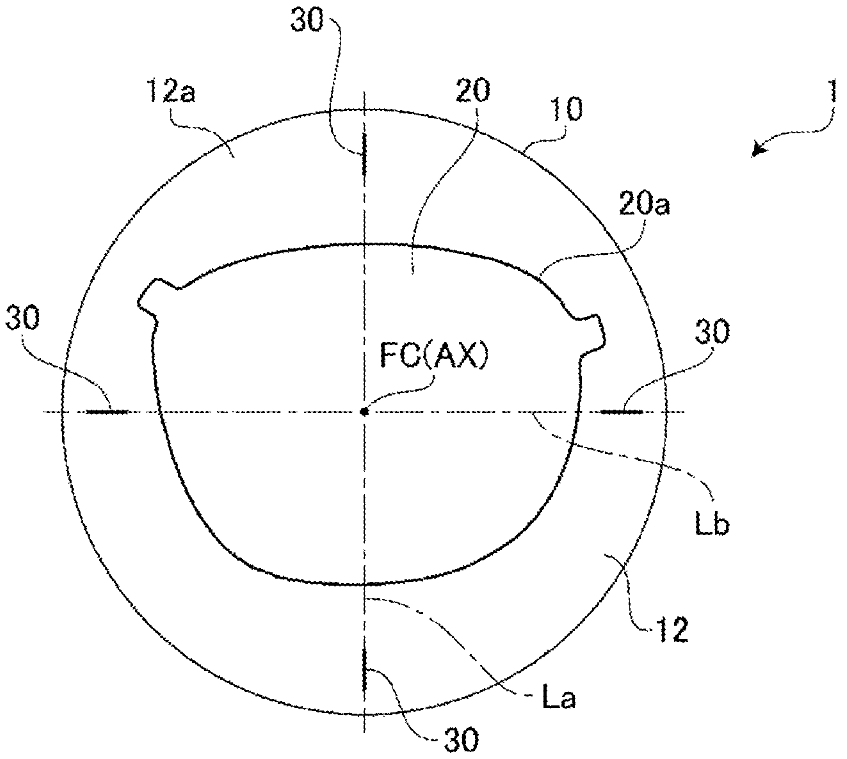
FIG. 1 is a front view of a semifinished lens according to an embodiment of the present invention.

A method for producing a spectacle lens according to an embodiment of the present invention will be described below with reference to the drawings. In the present embodiment, a semifinished lens designed for an EC lens and a method for producing a spectacle lens by using the semifinished lens will be described as an example.

The semifinished lens and the production method to which the present invention is applicable are not limited to a semifinished lens designed for an EC lens and a production method using the semifinished lens. The scope of the present invention also includes a semifinished lens in another form not designed for an EC lens and a production method using the semifinished lens with a frame at a layout position determined before processing on a non-optical surface.

The present embodiment describes a method for producing an inner-surface progressive power lens with a progressive refraction element on a concave surface by using a semifinished lens having a convex surface (object side) in a spherical shape finished to an optical surface and a concave surface (eye-ball side) serving as a non-optical surface. A semifinished lens and a production method to which the present invention is applicable are not limited thereto. For example, the scope of the present invention also includes a semifinished lens having a concave surface as an optical surface and a convex surface as a non-optical surface and a method for producing an outer-surface progressive power lens with a progressive refraction element on a convex surface by using the semifinished lens.

The scope of the present invention also includes a semifinished lens having a progressive refraction element added in one of the longitudinal direction and the lateral direction on an optical surface and a method for producing a progressive power lens of double-sided composite progressive type by using the semifinished lens. In this case, a non-optical surface is processed to add a progressive refraction element in the other of the longitudinal direction and the lateral direction, thereby obtaining a progressive power lens where the progressive refraction elements in the longitudinal and lateral directions are distributed on the convex surface and the concave surface, respectively.

The scope of the present invention also includes a semifinished lens with a progressive refraction element partially added to an optical surface and a method for producing a progressive power lens of double-sided progressive type by using the semifinished lens. In this case, a non-optical surface is processed to add the other part of the progressive refraction element, thereby obtaining a progressive power lens with the progressive refraction element distributed on each of the convex surface and the concave surface.

In the present embodiment, a spectacle lens produced by using a semifinished lens is not limited to a progressive power lens. Other kinds of spectacle lenses, for example, a unifocal spherical lens, a unifocal aspherical lens, or a multifocal (e.g., bifocal) lens other than progressive power lenses may be used instead.

Alternatively, a spectacle lens may be produced by using lens blanks, in which one of non-optical surfaces on both sides is finished into an optical surface, instead of the semifinished lens.

Figure 2:
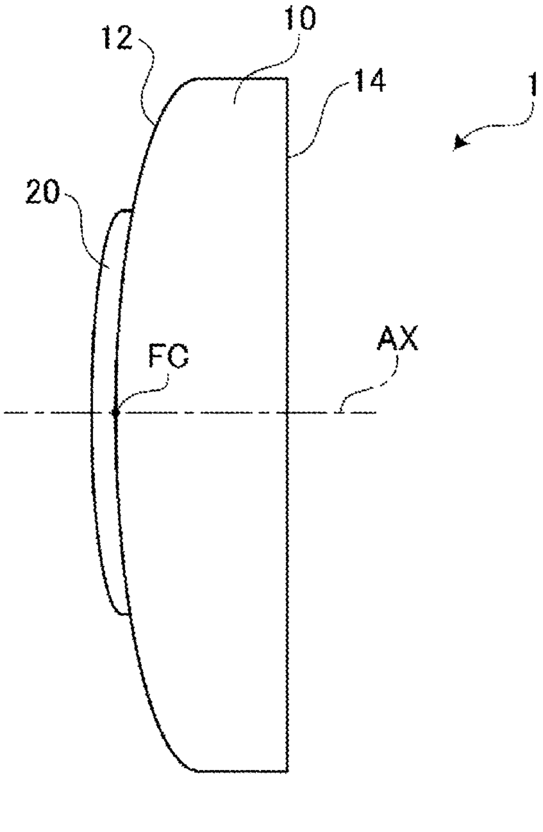
FIG. 2 is a side view of the semifinished lens according to the embodiment of the present invention.

FIG. 1 is a front view of a semifinished lens 1 designed for an EC lens according to an embodiment of the present invention (a front view of the semifinished lens 1 viewed in an optical-axis direction AX). FIG. 2 is a side view of the semifinished lens 1.

As illustrated in FIG. 1, the semifinished lens 1 has an electrochromic film 20 attached with marks 30 on the optical surface of the semifinished lens.

For convenience, in order to distinguish between the semifinished lens before the electrochromic film 20 and the marks 30 are added and the semifinished lens after the electrochromic film 20 and the marks 30 are added, the former will be referred to as "lens substrate 10" and the latter will be referred to as "semifinished lens 1."

The lens substrate 10 is made of a resin, for example, acrylic resin, thiourethane resin, thioepoxy resin, methacrylate resin, allyl resin, episulfide resin, or polycarbonate resin. A convex surface 12 has a spherical shape finished to an optical surface, and a concave surface 14 is a non-optical surface. The lens substrate 10 may be made of glass.

The electrochromic film 20 is a film including an electrochromic layer between a pair of electrode layers. The electrochromic layer includes, for example, a reduced layer that develops a color along with reduction reaction, an oxidation layer that develops a color along with oxidation reaction, and an electrolytic layer having electronic insulation and ionic conduction. The application of voltage to the pair of electrode layers causes a reversible oxidation-reduction reaction and reversibly changes the color of the electrochromic layer. The surface of the electrode layer is protected by a plastic layer or a glass layer.

The electrochromic film 20 is shaped like a frame (hereinafter referred to as "frame shape 20*a*") to mount a spectacle lens as an end product. The electrochromic film 20 is attached on the convex surface 12 of the lens substrate 10 with, for example, an adhesive.

In the present embodiment, the electrochromic film 20 is attached on the convex surface 12 of the lens substrate 10. The configuration of the present invention is not limited thereto. The electrochromic film 20 may be embedded in the lens substrate 10 by sheet insert molding.

On a semifinished lens in another form not designed for an EC lens, for example, marks in the frame shape 20*a* (in other words, the shape of a cut lens after lens shape processing) are made on the convex surface 12 instead of the electrochromic film 20 by using a laser marker or a marking press.

Also on the semifinished lens 1 designed for an EC lens, instead of the electrochromic film 20, marks in the frame shape may be made on the convex surface 12 by using a laser marker or a marking press. In this case, the electrochromic film 20 is attached on the convex surface 12 in the subsequent step (for example, after lens shape processing).

The marks 30 are marks for specifying a reference position FC of the frame shape 20*a* of the electrochromic film 20. In the present embodiment, the reference position FC is the center position (frame center) of the frame shape 20*a*.

The center position (reference position FC) of the frame shape 20*a* is the geometric center of the frame shape 20*a* and is different from the geometric center of the lens substrate 10. However, the reference position FC may be disposed at a position corresponding to the geometric center of the lens substrate 10.

The reference position FC is not limited to the geometric center of the frame shape 20*a*. In another embodiment, the reference position FC may be a different position from the geometric center of the frame shape 20*a*, for example, the center of gravity of the frame shape 20*a*.

Figure 3A:
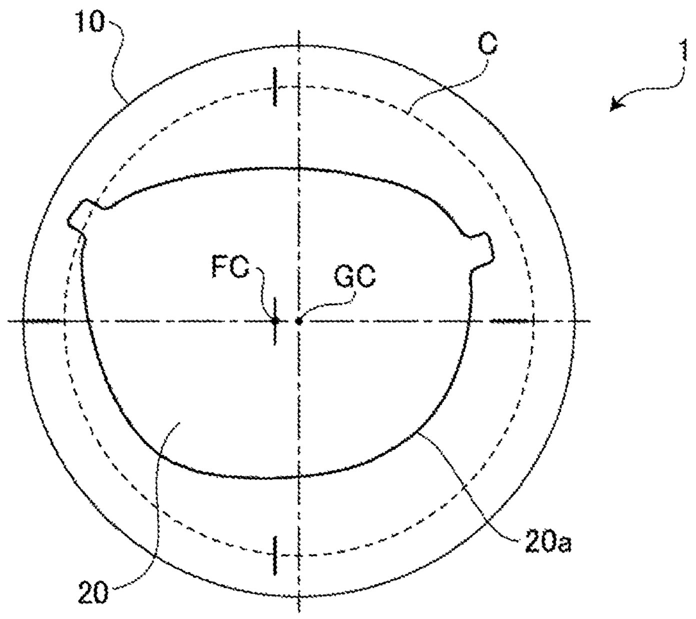
FIG. 3A illustrates the layout of the semifinished lens according to the embodiment of the present invention.
Figure 3B:
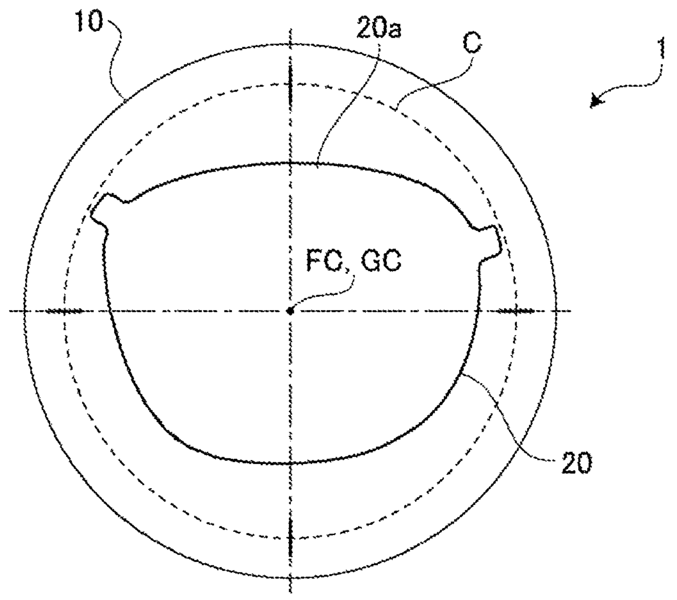
FIG. 3B illustrates the layout of the semifinished lens according to the embodiment of the present invention.

FIG. 3A is a front view of the semifinished lens 1 on which the reference position FC does not agree with a geometric center GC of the lens substrate 10. FIG. 3B is a front view of the semifinished lens 1 on which the reference position FC agrees with the geometric center GC of the lens substrate 10. In these drawings, for convenience, a dotted line indicates a circle C that has a smaller diameter than the semifinished lens land is centered around the geometric center GC of the lens substrate 10.

As illustrated in FIG. 3A, when the reference position FC and the geometric center GC of the lens substrate 10 do not agree with each other, the electrochromic film 20 is partially placed out of the circle C. As illustrated in FIG. 3B, when the reference position FC and the geometric center GC of the lens substrate 10 agree with each other, the electrochromic film 20 is entirely placed in the circle C. A comparison between FIGS. 3A and 3B proves that the diameter of the semifinished lens 1 can be reduced to the diameter of the circle C by placing the reference position FC at the position corresponding to the geometric center GC of the lens substrate 10. The reduction in the diameter of the semifinished lens 1 can suppress the cost of production.

As illustrated in FIG. 1, the marks 30 are made in a total number of four on the convex surface 12 of the lens substrate 10 and in a region 12*a* outside the frame shape 20*a* (in other words, a portion to be cut by lens shape processing). The four marks 30 are short-line marks that are made respectively in the upper portion, the lower portion, the right portion, and the left portion of the convex surface 12. When the semifinished lens 1 is viewed in the optical-axis direction AX (in other words, in a front view of the semifinished lens 1), the reference position FC is located at the intersection of a straight line La (one of a first straight line and a second straight line) connecting the lines of the upper portion and the lower portion and a straight line Lb (the other of the first straight line and the second straight line) that connects the lines of the right portion and the left portion and is orthogonal to the straight line La.

The marks 30 are made on the convex surface 12 by using, for example, a laser marker or a marking press.

After the electrochromic film 20 is attached on the convex surface 12, the attachment position of the electrochromic film 20 is measured. The marks 30 are positioned on the convex surface 12 according to the measured value and are made on the convex surface 12.

After the marks 30 are made on the convex surface 12, the electrochromic film 20 may be attached on the convex surface 12 such that the geometric center of the frame shape 20*a* is located at the reference position FC indicated by the marks 30.

The marks 30 may be any marks that can objectively specify the reference position FC. The marks 30 are not limited to the example of FIG. 1. FIGS. 4A to 4F are front views of semifinished lenses according to other embodiments.

Figure 4A:
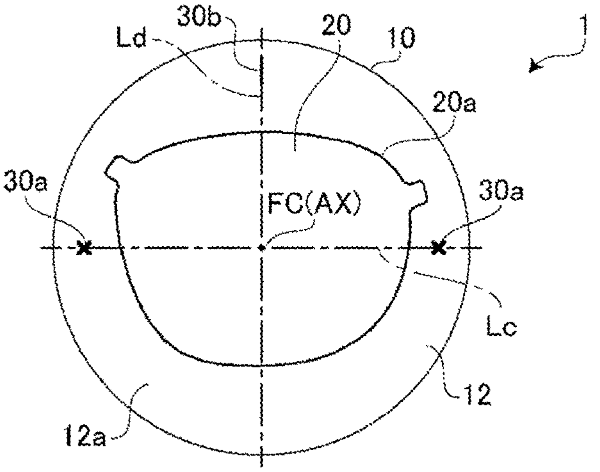
FIG. 4A is a front view of a semifinished lens according to another embodiment of the present invention.

As illustrated in FIG. 4A, marks 30 may be made in a total number of three in a region 12*a* outside a frame shape 20*a*. In the example of FIG. 4A, in the front view of a semifinished lens 1, the marks 30 include a pair of marks 30*a* located on a straight line Lc (first straight line) passing through a reference position FC and a mark 30*b* located on a straight line Ld (second straight line) that is orthogonal to the straight line Lc and passes through the reference position FC. The reference position FC is located at the intersection of the straight line Lc and the straight line Ld. Specifically, at least three marks 30 are necessary to objectively specify the reference position FC. The number of marks 30 is not limited to four.

The vertical direction of the semifinished lens 1 is easily identified by changing the shapes of the marks 30*a* and the mark 30*b*. In the example of FIG. 4A, the mark 30*b* having a different shape from the marks 30*a* is made in the upper portion of the convex surface 12. An operator can identify the vertical direction of the semifinished lens 1 by visually identifying the mark 30*b*.

Figure 4B:
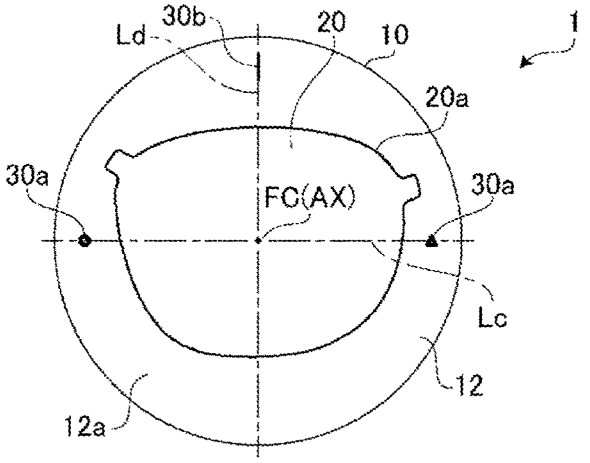
FIG. 4B is a front view of a semifinished lens according to another embodiment of the present invention.

A semifinished lens 1 in FIG. 4B is different from the example of FIG. 4A in the appearances (shapes) of a pair of left and light marks 30*a* located on a straight line Lc. The pair of marks 30*a* have different appearances, allowing an operator to identify whether the semifinished lens 1 corresponds to a right lens or a left lens.

The pair of marks 30*a* may have different colors or sizes in addition to the shapes. Alternatively, whether the semifinished lens 1 corresponds to a right lens or a left lens may be identified by the mark 30*b* alone. For example, the mark 30*b* may be an arrow mark indicating the nose side, enabling the identification only with the mark 30*b* alone.

Figure 4C:
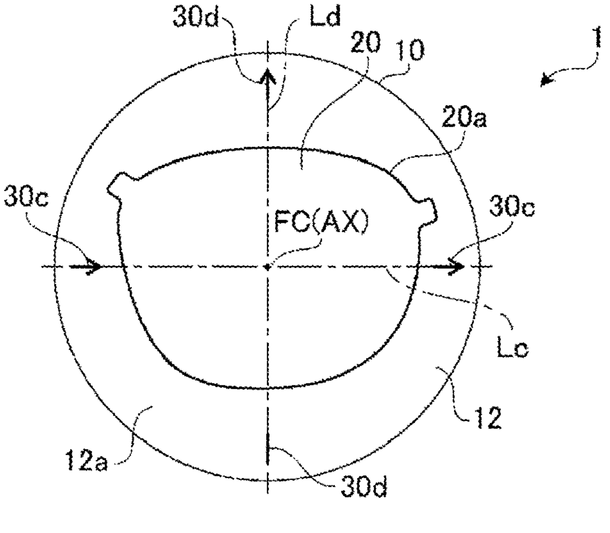
FIG. 4C is a front view of a semifinished lens according to another embodiment of the present invention.

As illustrated in FIG. 4C, in the front view of a semifinished lens 1, marks 30 include a pair of marks 30*c* located on a straight line Lc and a pair of marks 30*d* located on a straight line Ld. The pair of marks 30*c* are, for example, arrow marks indicating the nose side. An operator can identify whether the semifinished lens 1 corresponds to a right lens or a left lens by visually identifying the pair of marks 30*c*.

One of the pair of marks 30*d* is an arrow mark indicating the upper portion of the lens and the other of the pair of marks 30*d* is a short-line mark. An operator can identify the vertical direction of the semifinished lens 1 by visually identifying the pair of marks 30*d* (or the direction of the arrow mark).

The positions and appearances of the marks 30 are devised thus, thereby preventing an operator from erroneously identifying the vertical and horizontal directions of the semifinished lens 1 during an operation even if the orientation of the electrochromic film 20 is difficult to determine because of the shape of the electrochromic film 20 (e.g., a perfect circle).

Figure 4D:
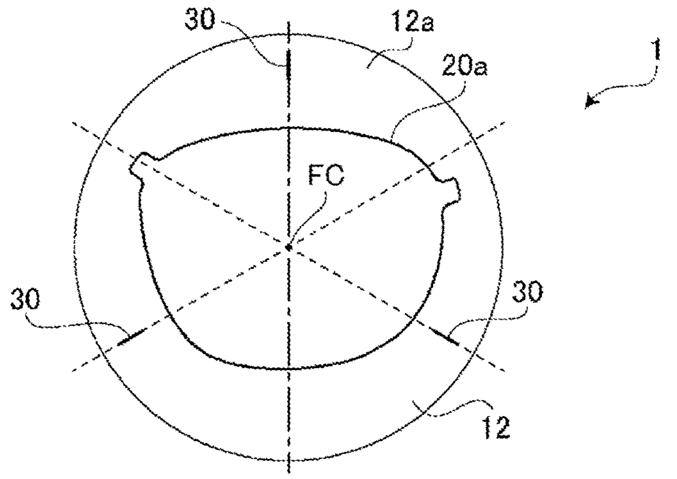
FIG. 4D is a front view of a semifinished lens according to another embodiment of the present invention.

As illustrated in FIG. 4D, marks 30 may be made in a total number of three at 120 degree intervals in a region 12*a* outside a frame shape 20*a*. In the example of FIG. 4D, a reference position FC is located at the intersection point of the extensions of the three marks 30.

Figure 4E:
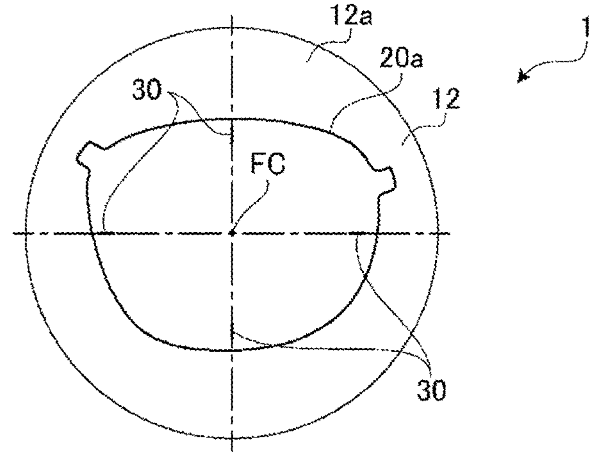
FIG. 4E is a front view of a semifinished lens according to another embodiment of the present invention.

As illustrated in FIG. 4E, marks 30 may be made in a region inside a frame shape 20*a*. In other words, the marks 30 may be any marks that can objectively specify a reference position FC. The marks 30 may be disposed in a region other than a region 12*a* outside the frame shape 20*a*.

Figure 4F:
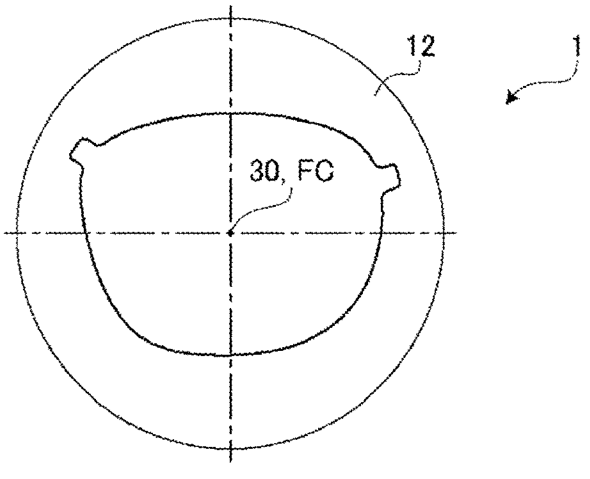
FIG. 4F is a front view of a semifinished lens according to another embodiment of the present invention.

As illustrated in FIG. 4F, a mark 30 may be directly made at a reference position FC. In other words, the mark 30 is not limited to a mark indirectly indicating the reference position FC. The mark 30 may directly indicate the reference position FC. In the case of production of progressive power lenses or lenses having astigmatism power, the axial directions of the lenses need to be determined. However, the mark 30 illustrated in FIG. 4F does not allow an operator to identify the axial direction of the lens. Thus, in the example of FIG. 4F, an additional mark may be made to indicate the axial direction of the lens.

In the examples of FIGS. 4E and 4F, the marks 30 are left on the cut lens after the lens shape processing. For this reason, the marks 30 are lightly carved like hidden marks on the convex surface 12.

In the example of FIGS. 4E and 4F, the marks 30 are made on the convex surface 12. The configuration of the present invention is not limited thereto. The marks 30 may be made on the electrochromic film 20. In this case, the marks 30 may be made on the electrochromic film 20 before the electrochromic film 20 is attached to the convex surface 12 or the marks 30 may be made on the electrochromic film 20 after the electrochromic film 20 is attached to the convex surface 12.

Figure 5:
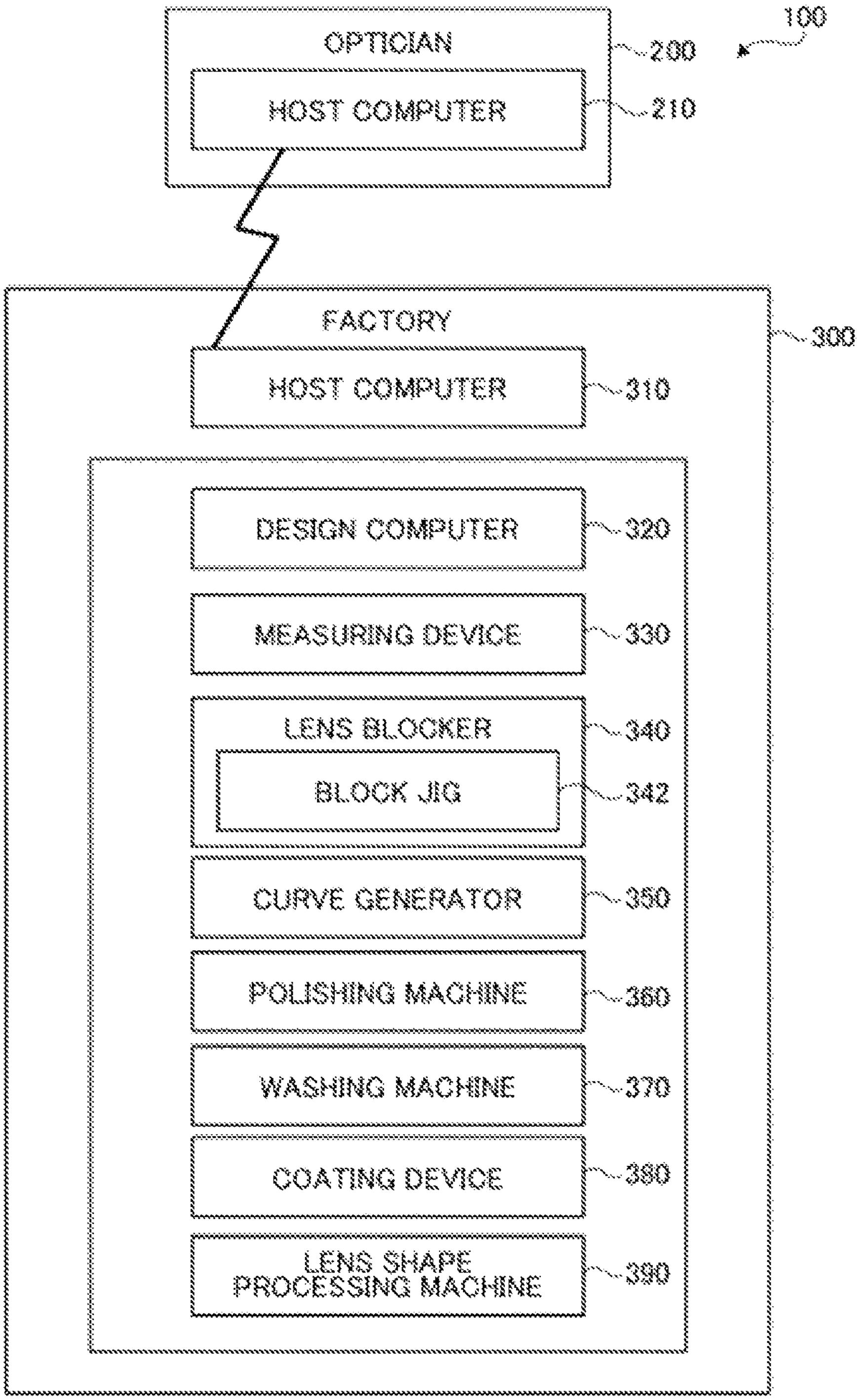
FIG. 5 is a block diagram illustrating the configuration of a production system according to the embodiment of the present invention.

FIG. 5 is a block diagram illustrating the configuration of a production system 100 according to an embodiment of the present invention. As illustrated in FIG. 5, the production system 100 includes an optician 200 and a factory 300.

The optician 200 places an order for spectacle lenses according to a prescription for a customer (wearer). The factory 300 produces spectacle lenses in response to the order from the optician 200. The order to the factory 300 is placed through data transmission via a predetermined network, e.g., the Internet or fax or the like. Persons who places orders may include ophthalmologists and ordinary consumers.

In the optician 200, a store computer 210 is installed. The store computer 210 is, for example, a tablet, a smartphone, a desktop PC (Personal Computer), or a notebook PC. Software for placing an order with the factory 300 for spectacle lenses is installed in the store computer 210. Spectacle lenses can be ordered also on the Web. In this case, the installation of the software in the store computer 210 is not necessary. To the store computer 210, lens data and frame data are inputted through operations of a mouse and a keyboard or the like by a staff member of the optician or a wearer.

The lens data includes, for example, prescription information of wearers (including distance power, near power, addition power, a corridor length, a base curve, spherical power, cylindrical power, a cylinder axis direction, prismatic power, a prism base setting, and an interpupillary distance (PD: Pupillary Distance)), the wearing conditions of spectacle lenses (the position of a distant eyepoint, a distance between corneal apexes, a forward tilt angle, a frame tilt angle), the kind of spectacle lenses (a unifocal spherical surface, a unifocal aspherical surface, multifocal (omnifocal, progressive), a coating (including dyeing and finishing, a hard coating, an antireflection coating, and UV-blocking)), layout data for a request from a wearer, and the presence or absence of an optical/toning function.

The frame data includes shape data on a frame selected by the wearer. The frame data is managed by, for example, a bar code tag and can be acquired by reading the bar code tag through a bar code reader. The shape data on the frame may be acquired by a frame tracer installed at the optician 200.

The store computer 210 transmits order data (lens data and frame data) to the factory 300 via, for example, the Internet.

In the factory 300, a LAN (Local Area Network) is constructed with a host computer 310 located at the center. A large number of terminal devices including the design computer 320 constituting the production equipment of spectacle lenses are connected to the host computer 310.

The design computer 320 is, for example, an ordinary PC in which a program for designing spectacle lenses is installed. The order data transmitted from the store computer 210 via the Internet is inputted to the host computer 310. The host computer 310 transmits the inputted order data to the design computer 320.

In the factory 300, in order to improve the productivity, the powers of the overall production range are divided into a plurality of groups, and the lens substrates 10 (that is, semifinished lenses) of various kinds with convex-surface curving shapes (e.g., a spherical shape and an aspherical shape) and lens diameters are prepared for orders of spectacle lenses such that the convex-surface curving shapes and the lens diameters match the power ranges of the groups.

Figure 6:
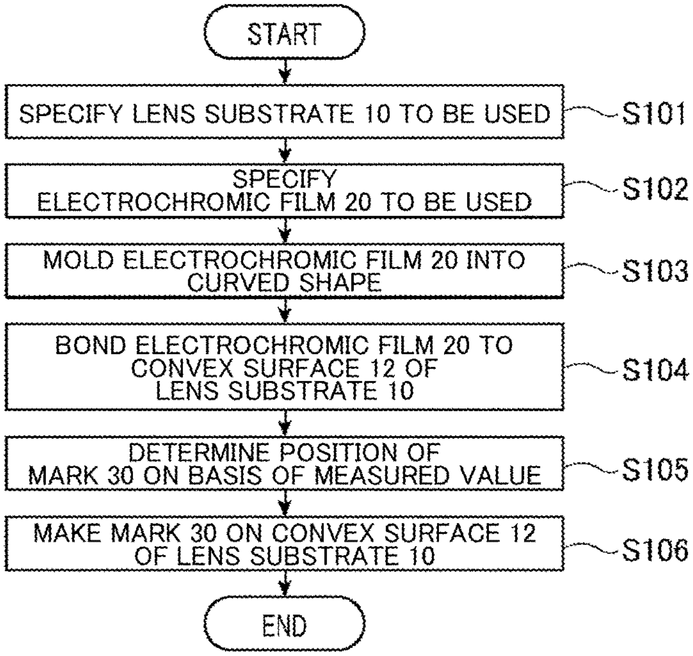
FIG. 6 is a flowchart of the method for producing the semifinished lens according to the embodiment of the present invention.

FIG. 6 is a flowchart of the method for producing the semifinished lens 1.

In the present production method, first, the lens substrate 10 suitable for the prescription of a wearer is specified based on order acceptance data by a design computer 320 from kinds of lens substrates 10 having different powers and lens diameters (step S101).

Subsequently, the flat electrochromic film 20 having a shape corresponding to a frame designated by the order acceptance data is specified by the design computer 320 (step S102).

An operator sets the flat electrochromic film 20, which is specified in step S102, into a mold and molds the film into a curved shape (step S103). As a specific example, the mold is selected according to the shape of the convex surface 12 of the lens substrate 10 specified in step S101, and the electrochromic film 20 held between the male die and the female die of the selected mold is heated to a predetermined temperature. The thermoforming obtains the electrochromic film 20 having a curved shape.

The electrochromic film 20 molded into the curved shape is placed on the convex surface 12 of the lens substrate 10 and is bonded to the convex surface 12 with an adhesive (step S104). In other words, step S104 is the step of attaching the electrochromic film 20 (a film that includes an electrochromic layer between a pair of electrode layers and has a frame shape) to the semifinished lens (lens substrate 10). The lens substrate 10 with the electrochromic film 20 attached to the convex surface 12 is obtained in step S104.

For example, in the production of a semifinished lens in another form not designed for an EC lens, step S104 is replaced with the step of making marks in a frame shape on the optical surface of the semifinished lens.

The bonding position of the electrochromic film 20 bonded on the convex surface 12 is measured. The position of the mark 30 is determined on the basis of the measured value (step S105). Specifically, step S105 is a mark positioning step of determining the positions of at least three marks 30 on the semifinished lens (lens substrate 10) so as to specify the reference position FC on the basis of the at least three marks 30.

In the region 12*a* outside the frame shape 20*a* on the convex surface 12 of the lens substrate 10, four marks 30 are made by a laser marker or a marking press (step S106). Specifically, step S106 is a marking step of making at least three marks 30 at the respective positions determined in step S105 on the semifinished lens (lens substrate 10). Through this step, the semifinished lens 1 illustrated in FIGS. 1 and 2 is obtained.

When the marks 30 are made on the convex surface 12, hidden marks and other necessary information (for example, a product certification mark or an identification symbol) may be added on the convex surface 12. In this case, the production efficiency can be improved as compared with the case where the marks 30 and hidden marks or the like are made in different steps.

Figure 7:
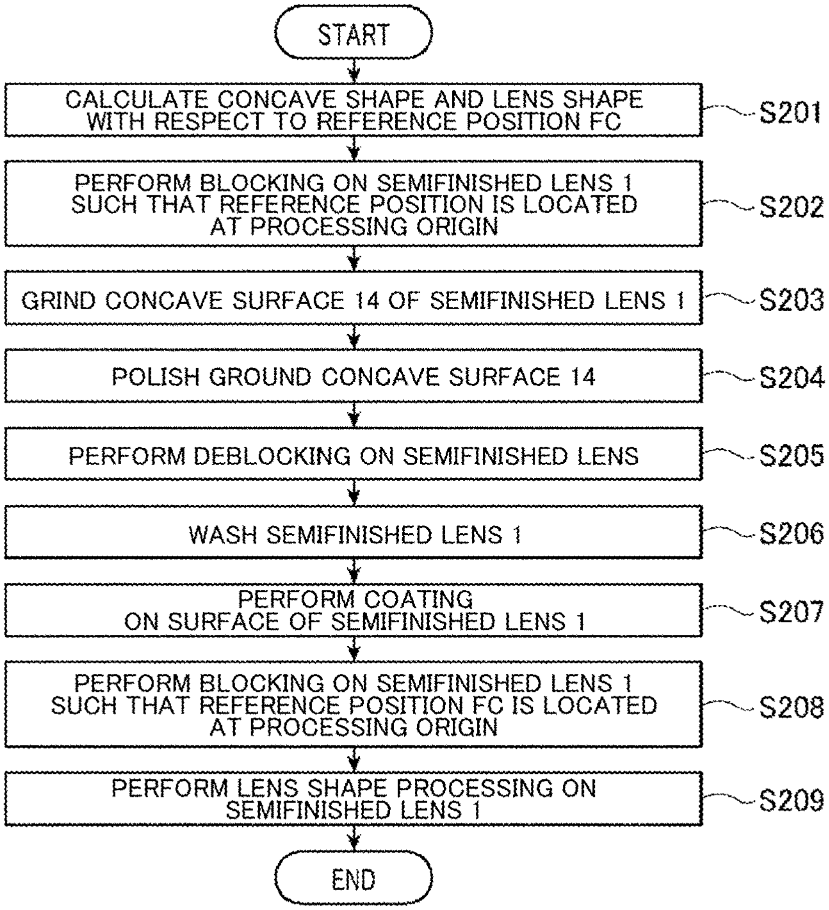
FIG. 7 is a flowchart of the method for producing a spectacle lens according to a prescription by using the semifinished lens produced according to the flowchart of FIG. 6.

FIG. 7 is a flowchart of the method for producing a spectacle lens according to a prescription by using the semifinished lens 1 produced according to the flowchart of FIG. 6.

In the related art, a concave shape is calculated with respect to a point specified by a hidden mark (a geometric center of a unifocal lens), and then a concave surface is processed with respect to this point. However, even if the concave shape is calculated and processed with respect to this point, the concave shape is hard to calculate and process while the layout position of the electrochromic film 20 attached on the convex surface 12 is strictly considered, making it difficult to determine the position of an eye point with high accuracy with respect to the layout position of the electrochromic film 20. Hence, an error of the position of an eye point with respect to the layout position of the electrochromic film 20 may cause problems. For example, the electrochromic film 20 may be partially cut during lens shape processing or the position of an eye point may fail to correspond to a prescription.

In the production method indicated in the flowchart of FIG. 7, a concave shape is calculated with respect to the reference position FC of the frame shape 20*a* of the electrochromic film 20 and a concave surface is processed with respect to the reference position FC. The concave shape is calculated and processed in consideration of the layout position of the frame shape 20*a*. This suppresses an error of the position of an eye point with respect to the layout position, thereby suppressing the occurrence of the problems.

First, as indicated in FIG. 7, the design computer 320 calculates a concave shape and a lens shape with respect to the reference position FC on the basis of the order acceptance data (step S201). Specifically, step S201 is a calculation step of calculating the shape of the concave surface 14 with respect to the reference position FC when the concave surface 14 of the semifinished lens 1 is processed according to a prescription.

Prior to the processing of step S201, shape data on the frame is acquired. The shape data on the frame may be known data or data measured by a measuring device 330. In the former case, the design computer 320 holds shape data on various frames in advance.

The acquisition of shape data on a frame measured by the measuring device 330 will be described below. In the measurement of the shape of the frame, the probe of the measuring device 330 is brought into contact with the edge groove of the frame. The measuring device 330 rotates the probe around a predetermined point and detects the shape coordinate values (Rn, θn, Zn) (n=1, 2, . . . N) of the edge groove. The detected shape coordinate values (Rn, θn, Zn) are transferred to the design computer 320.

For example, the design computer 320 calculates the center position (a, b, c) of a virtual spherical surface, a radius value RB of the virtual spherical surface on the assumption that the frame is located on the virtual spherical surface, a frame PD (Pupillary Distance), a frame nasal breadth DBL, a frame tilt angle, and a forward tilt angle on the basis of the shape coordinate values (Rn, θn, Zn).

Figure 8:
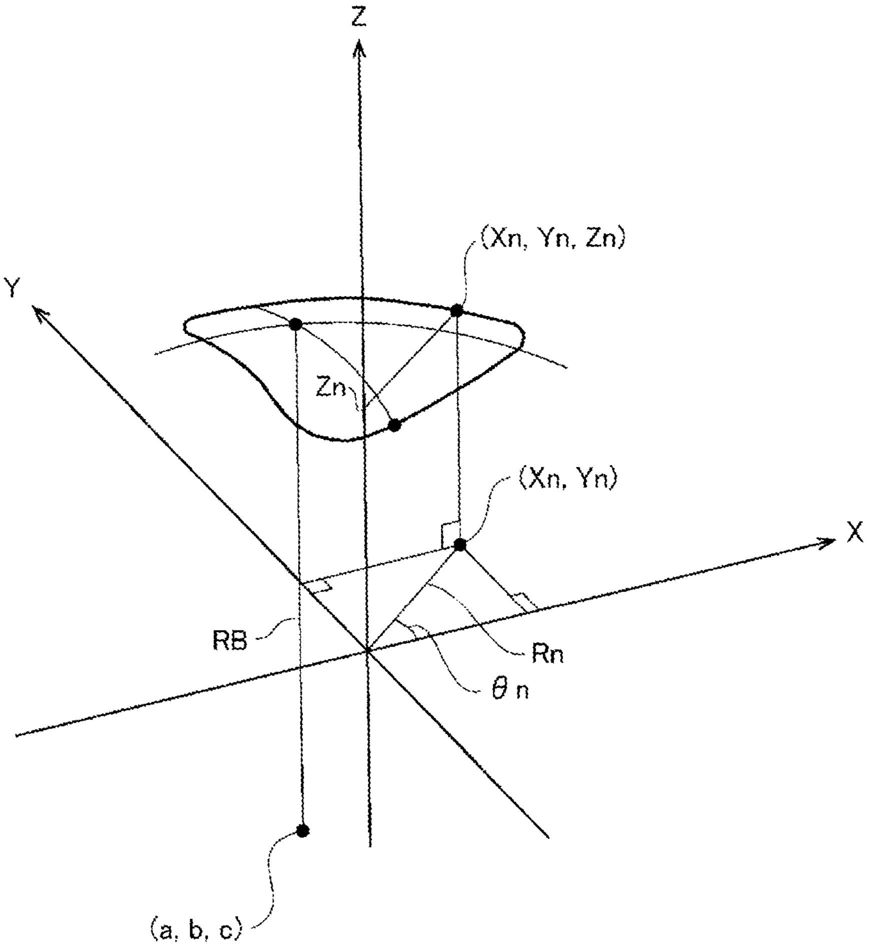
FIG. 8 is an explanatory drawing of a method for calculating the position of an eye point with respect to the reference position of a frame according to the embodiment of the present invention.
Figure 9:
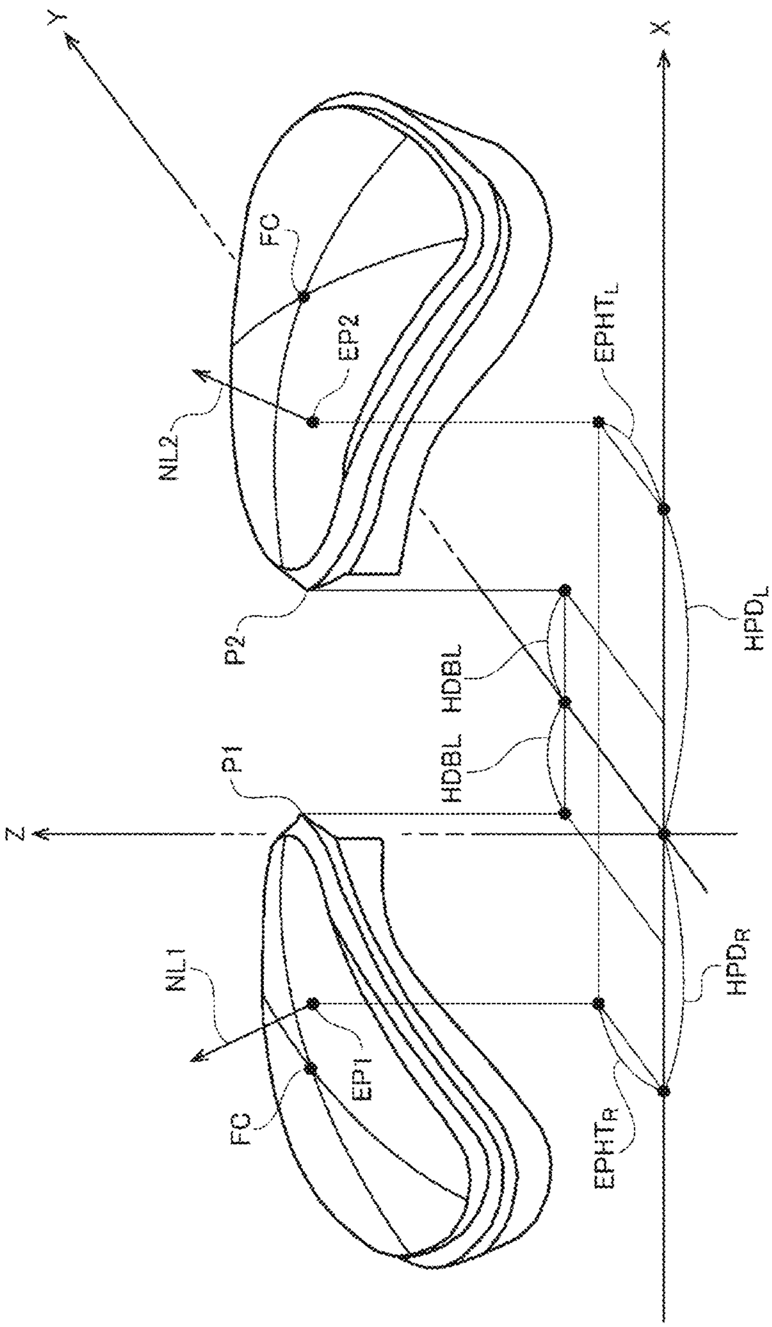
FIG. 9 is an explanatory drawing of a method for calculating the position of an eye point with respect to the reference position of a frame according to the embodiment of the present invention.

In step S201, the concave shape is calculated with respect to the reference position FC and thus the position of an eye point is also calculated with respect to the reference position FC. Referring to FIGS. 8 and 9, a method for calculating the position of an eye point with respect to the reference position FC will be described below. FIG. 8 is a perspective view of the relationship between the constants of a virtual spherical surface and rectangular coordinate values. FIG. 9 is a perspective view of left and right spectacle lenses disposed on the basis of the layout positions of the frame shapes 20*a*.

The shape coordinate values (Rn, θn, Zn) detected by the measuring device 330 are converted into frame shape coordinate values (Xn, Yn, Zn) (n=1, 2, . . . , N). Specifically, as indicated in FIG. 8, rectangular coordinate values (Xn, Yn) of the frame shape coordinate values (Xn, Yn, Zn) are obtained by converting polar coordinate values (Rn, θn). Zn is calculated as a Z-axis coordinate value at (Xn, Yn) on a spherical surface. The Z-axis direction is the front direction of the frame.

In the present calculation method, "frame coordinates" are determined with the X axis serving as a datum line that is the horizontal reference axis of the spectacles, the Y axis serving as the vertical direction of the spectacles, and the Z axis serving as the front direction of the spectacles. Moreover, two frame shape coordinate values (Xn, Yn, Zn) are defined on the frame coordinates with the reference positions FC located at the respective center positions of the left and right frames.

Specifically, first, the two frame shape coordinate values (Xn, Yn, Zn) are set such that points P1 and P2 closest to the nose side on the left and right frame shapes 20*a* have X coordinate values of −HDBL and +HDBL. HDBL is a value obtained by dividing a frame nasal breadth DBL by 2.

The frame shape coordinate values (Xn, Yn, Zn) on one side (an X coordinate value of −HDBL closest to the nose side) are rotationally moved by a frame tilt angle around an axis that is a straight line passing through the point P1 in parallel with the Y axis, and the frame shape coordinate values (Xn, Yn, Zn) on the other side (an X coordinate value of +HDBL closest to the nose side) are rotationally moved by a frame tilt angle around an axis that is a straight line passing through the point P2 in parallel with the Y axis. Furthermore, the frame shape coordinate values (Xn, Yn, Zn) on one side may be rotationally moved by a forward tilt angle around an axis that is a straight line passing through the point P1 in parallel with the X axis, and the frame shape coordinate values (Xn, Yn, Zn) on the other side may be rotationally moved by a forward tilt angle around an axis that is a straight line passing through the point P2 in parallel with the X axis.

In this way, the positions and orientations of the spectacle lenses with respect to the three-dimensional frame shapes defined on the frame coordinates are specified by determining eye point positions EP1 and EP2 and normal directions NL1 and NL2 at the eye point positions on the convex surfaces of the spectacle lenses.

The eye point positions EP1 and EP2 are points on the convex surfaces of the spectacle lenses. Each of the points is to be located at the center of the pupil of a wearer when the wearer wears the spectacles. Layout information about the eye point positions EP1 and EP2 is included in lens data acquired at the optician 200. The layout information includes a horizontal distance HPD from the center line of the nose of the wearer to the center of the pupil of the wearer and a vertical distance EPHT from the datum line to the center of the pupil of the wearer. Hereinafter, the horizontal distance and the vertical distance of the spectacle lens for the right eye are denoted as $HPD_R$ and $EPHT_R$, respectively. The horizontal distance and the vertical distance of the spectacle lens for the left eye are denoted as $HPD_L$ and $EPHT_L$, respectively.

Thus, the X and Y coordinates of the eye point position EP1 are determined at ($-HPD_R$, $EPHT_R$) and the X and Y coordinates of the eye point position EP2 are determined at ($-HPD_L$, $EPHT_L$). The Z coordinate of the eye point position EP1 is determined according to the position of an edged portion (a position where an edged portion is provided on a lens edge face, for example, a convex surface edge or a concave surface edge). The position of the edged portion is included in, for example, lens data acquired at the optician 200.

In this way, the eye point positions EP1 and EP2 with respect to the reference position FC (that is, the eye point positions with respect to the layout position of the electrochromic film 20) are determined. The concave surface shapes and the lens shapes of the semifinished lenses 1 are calculated according to a prescription such that eye points are laid out at the determined positions EP1 and EP2. Specifically, in step S201, the eye point positions EP1 and EP2 are calculated in consideration of the reference positions FC, and the shapes of the concave surfaces 14 are calculated on the basis of the calculated eye point positions EP1 and EP2. The calculation of a concave surface shape and a lens shape according to a prescription is known, and thus a specific explanation thereof is omitted.

A block jig 342 is bonded onto the convex surface 12 of the semifinished lens 1 with a low-melting-point alloy, e.g., an alloy interposed between the convex surface 12 and the block jig 342 (step S202). In other words, blocking is performed.

Specifically, in step S202, the semifinished lens 1 is imaged by a camera device installed in a lens blocker 340, and the image of the semifinished lens 1 is displayed on the display of the lens blocker 340. On the display, mark images are displayed at positions predetermined by calculation such that the mark images are superimposed on the captured image. The mark images are, for example, images of short lines like the marks 30 and are displayed in a total number of four in the upper part, the lower part, the right part, and the left part of the screen.

When the block jig 342 holds the semifinished lens 1 in order to perform concave surface processing and lens shape processing, a reference point is referred to as a processing origin. An operator makes a fine adjustment to the position of the semifinished lens 1 while confirming the four marks 30 and the four mark images on the semifinished lens 1, the marks and mark images being displayed on the display. The operator then blocks the semifinished lens 1 at a position where the four marks 30 match the respective mark images. Thus, the semifinished lens 1 is held by the block jig 342 such that the reference position FC is located at the processing origin.

Concave surface shape data calculated in step S201 is transmitted from the design computer 320 to a curve generator 350. The curve generator 350 grinds, on the basis of the concave surface shape data, the concave surface 14 of the semifinished lens 1 held by the block jig 342 into the concave surface shape calculated in step S201 (in other words, to obtain a shape and power according to a prescription) (step S203). Specifically, step S204 is a surface shape processing step of processing the concave surface 14 of the semifinished lens 1 with respect to the reference position FC into the shape calculated in step S201.

In step S201, the shape of the concave surface is calculated in consideration of the eye point position with respect to the reference position FC, thereby determining the eye point position with high accuracy with respect to the layout position of the frame shape. Thus, the eye point position can be determined with high accuracy with respect to the layout position of the frame shape by performing concave surface processing with the reference position FC serving as the processing origin.

In order to improve polishing on the concave surface 14 and the adhesive property of a coating agent, the concave surface 14 is polished by a polishing machine 360 (step S204). Thus, the concave surface 14 is formed as an optical surface meeting the prescription.

The low-melting-point alloy is dissolved by hot water, and the semifinished lens 1 is removed from the block jig 342 (step S205). Subsequently, the semifinished lens 1 is washed by a washing machine 370 to remove contamination and foreign matters (step S206).

A coating device 380 performs coating (e.g., hard coating or antireflection coating) on the convex surface 12 (and the electrochromic film 20) and the concave surface 14 of the semifinished lens 1 (step S207).

At this point, the electrochromic film 20 having the frame shape 20*a* is attached on the semifinished lens 1. This allows an operator to easily identify a portion to be finally used and a portion not to be finally used on the semifinished lens 1 as a spectacle lens.

For example, it is assumed that a fault (a scratch or contamination with a foreign matter during coating) is found in the region 12*a* outside the frame shape 20*a*. The region 12*a* is a portion to be cut by lens shape processing and thus the fault is not left on a spectacle lens as an end product. Thus, even if the semifinished lens 1 has such a fault, the semifinished lens 1 can be used as a non-defective item. This can improve yield.

The semifinished lens 1 after the coating is subjected to blocking as in step S202 (step S208). Also at this point, the semifinished lens 1 is held by the block jig 342 such that the reference position FC is located at the processing origin.

Lens shape data calculated in step S201 is transmitted from the design computer 320 to a lens shape processing machine 390. The lens shape processing machine 390 performs lens shape processing on the semifinished lens 1 on the basis of the lens shape data (step S209). Specifically, step S209 is a lens shape processing step of performing lens shape processing on the semifinished lens 1 with the processed concave surface 14 with respect to the reference position FC.

In step S201, the lens shape is calculated with respect to the reference position FC of the frame shape 20*a* of the electrochromic film 20. This suppresses a displacement between the position of the lens shape processing and the position of the electrochromic film 20. Thus, the lens shape processing is performed without cutting the electrochromic film 20.

The above is the exemplary embodiments of the present invention. The embodiments of the present invention are not limited to the foregoing description and can be modified in various manners within the scope of the technical idea of the present invention. For example, the embodiments of the present application also include examples and modifications that are exemplarily illustrated in the specification or the contents of apparent examples and modifications that are combined as appropriate.

In the foregoing embodiments, the concave surface and the lens shape are calculated and processed with respect to the reference position FC. In view of the accomplishment of the object of calculating and processing these shapes with respect to the reference position FC, the present invention may include a semifinished lens that is not provided with the electrochromic film 20 or marks indicating the frame shape 20*a* (specifically, a configuration in which the electrochromic film 20 is omitted from the semifinished lens 1 illustrated in FIG. 1).

The invention claimed is:

1. A semifinished lens comprising at least three marks for specifying a center position of a frame shape and a film including an electrochromic layer between a pair of electrode layers, wherein when the semifinished lens is viewed in an optical axis direction, the at least three marks include a pair of marks located on a first straight line passing through the center position and a mark located on a second straight line that is orthogonal to the first straight line and passes through the center position, the film has the frame shape, positions of the at least three marks are determined based on an actual measurement of a position of the film attached to the semifinished lens, and and the at least three marks are made after the film is attached to the semifinished lens.

2. The semifinished lens according to claim 1, wherein the at least three marks are made in a portion to be cut by lens shape processing.

3. The semifinished lens according to claim 2, wherein the at least three marks are made on an optical surface of the semifinished lens.

4. The semifinished lens according to claim 3, further comprising marks made in the frame shape on the optical surface of the semifinished lens.

5. The semifinished lens according to claim 2, further comprising marks made in the frame shape on the optical surface of the semifinished lens.

6. The semifinished lens according to claim 1, wherein the at least three marks are made on an optical surface of the semifinished lens.

7. The semifinished lens according to claim 6, further comprising marks made in the frame shape on the optical surface of the semifinished lens.

8. The semifinished lens according to claim 1, further comprising marks made in the frame shape on an optical surface of the semifinished lens.

* * * * *